Nov. 17, 1925.  
E. C. BELLINGER  
STEERING MEANS FOR TRACTORS  
Original Filed Aug. 18, 1923   2 Sheets-Sheet 2
1,561,505
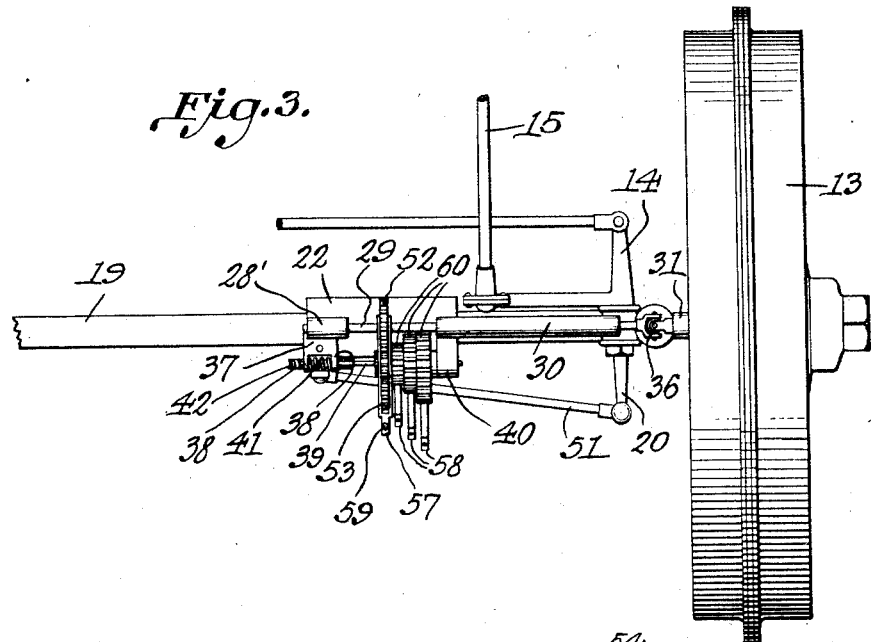
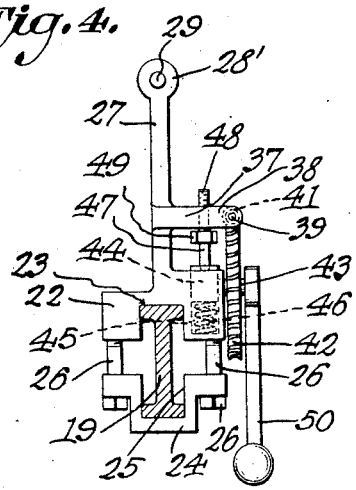
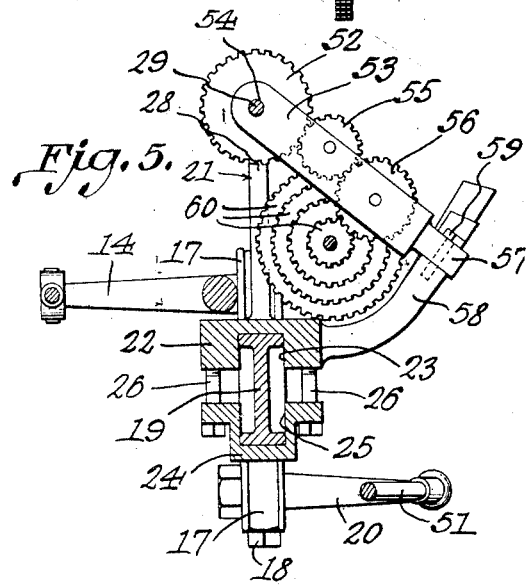
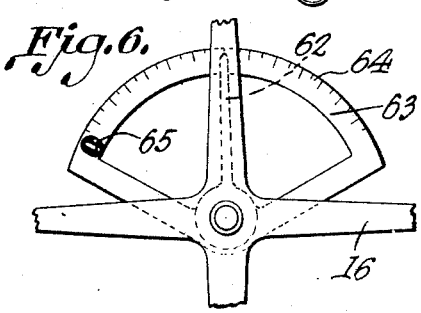
Inventor  
*Edmund C. Bellinger*
By *B P Fishburne*
Attorney Patented Nov. 17, 1925.

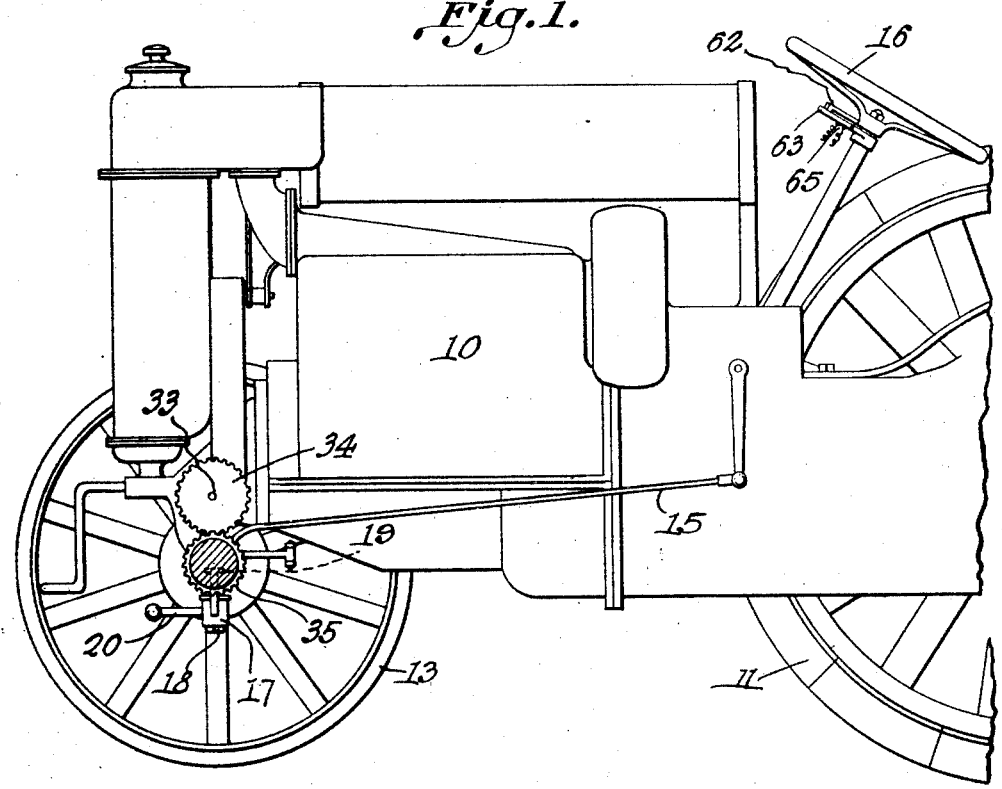
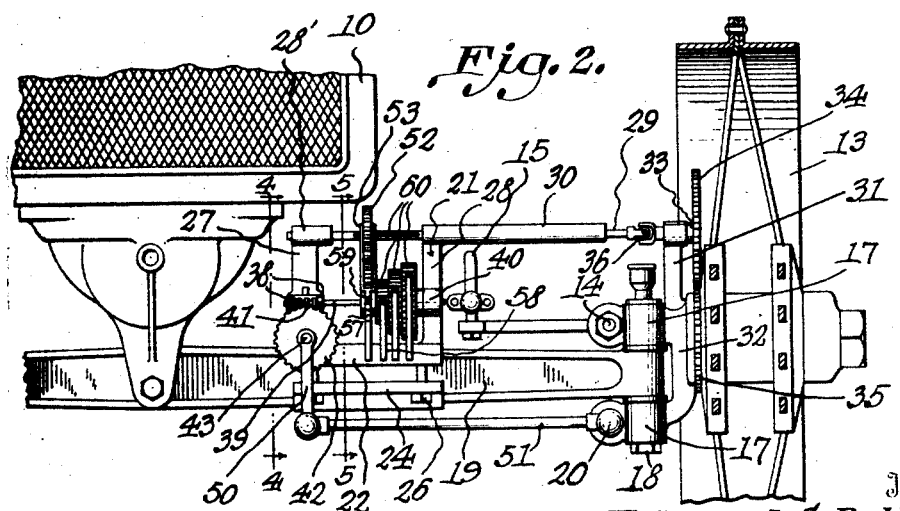

1,561,505

UNITED STATES PATENT OFFICE.

EDMUND C. BELLINGER, OF ATLANTA, GEORGIA.

STEERING MEANS FOR TRACTORS.

Application filed August 18, 1923, Serial No. 658,072. Renewed August 14, 1925.

*To all whom it may concern:*

Be it known that I, EDMUND C. BELLINGER, a citizen of the United States, residing at Atlanta, in the county of Fulton and State of Georgia, have invented certain new and useful Improvements in Steering Means for Tractors, of which the following is a specification.

My invention relates to automatic steering mechanism for tractors.

An important object of the invention is to provide mechanism of the above mentioned character, whereby a tractor may be automatically steered, without the driver, and made to travel in a spiral path, from the outer edge of the field, inwardly toward the center.

A further object of the invention is to provide means of the above mentioned character, which is so constructed that the steering wheels may be manually turned, in adjusting the same at the starting and also may be manually turned during the use of the tractor under ordinary conditions.

A further object of the invention is to provide mechanism of the above mentioned character, which is of relatively simplified construction and may be driven from one of the wheels of the tractor.

A further object of the invention is to provide apparatus of the above mentioned character, which is so compact in construction that the same is adapted to be mounted upon the front axle of the automobile, in proximity to the wheel to be steered thereby, such apparatus also being driven from such front wheel.

Other objects and advantages of the invention will be apparent during the course of the following description.

In the accompanying drawings forming a part of this specification, and in which like numerals are employed to designate like parts throughout the same, Figure 1 is a side elevation of a tractor, showing my steering apparatus applied thereto, the inner front wheel of the tractor having its hub shown in section, with parts removed, Figure 2 is a side elevation of the front axle of the tractor with my steering apparatus applied thereto, Figure 3 is a plan view of the same, Figure 4 is a transverse section taken on line 4—4 of Figure 2, Figure 5 is a similar view taken on line 5—5 of Figure 2, and, Figure 6 is a plan view of a stationary quadrant scale and associated elements.

In the drawings, wherein for the purpose of illustration is shown a preferred embodiment of my invention, the numeral 10 designates a tractor, shown for the purpose of illustration as the Fordson tractor. This tractor has its top portion mounted upon the rear wheels 11 and front wheels 13, as well known. The front wheels are of course connected by the usual drag link to be steered in unison, and one front wheel is turned in steering by a rearwardly projecting crank 14, pivotally connected with a rod 15, extending rearwardly and suitably connected with a steering wheel 16. The crank 14 is attached to the upper knuckle 17 of the spindle of the front wheel. The upper and lower knuckles 17 are pivoted by means of a pin 18 upon the end of the front axle 19, as shown.

Connected with the lower knuckle 17 is a forwardly extending crank 20, included in the present invention.

I provide a support or frame 21, which is clamped to the front axle 19. This frame embodies a base or clamp element 22, provided in its lower side with a groove 23, for receiving the upper edge of the axle 19, as clearly shown in Figure 5. Arranged beneath the axle 19 and opposite the base of clamp element 22 is a coacting clamp element 24, having a groove 25, receiving the lower edge of the axle 19. The clamp elements 22 and 24 are connected by bolts 26 or the like. It is thus seen that the frame or support 21 is rigidly mounted upon the axle 19. This frame or support embodies upstanding arms 27 and 28, as shown.

At its upper end, the arm 27 is provided with a head or bearing 28', rotatably receiving a horizontal drive shaft 29, also rotatable within a sleeve 30, preferably integral with the arm 28. The bearing 28' and sleeve 30 preferably extend above the axle 19 in alinement therewith. An upstanding arm 31 is rigidly mounted upon the knuckle-carrying yoke 32 of the spindle and has a shaft 33 rotatable thereon. This shaft has a gear 34 rigidly secured to its outer end, in mesh with a gear 35, formed upon, or attached to the inner end of the hub of the wheel 13. It is thus seen that the gear 35 drives the gear 34, during the rotation of the steering wheel, and these gears are in permanent mesh when the steering wheel is turned in steering. At its inner end, the shaft 33 projects beyond the arm 31 and is connected with the outer end of the shaft 29 by means of a universal joint 36, having its pivot in vertical alinement with the pin or pivot 18. The shaft 29 may also move longitudinally slightly, if necessary, but the alinement of the pivot of the universal joint 36 with the pin or pivot 18, permits of the steering of the front wheel without the perceptible longitudinal movement of the shaft 29.

The arm 27 is provided upon its forward side with a forwardly projecting block 37, carrying spaced fingers 38. These fingers rotatably receive the inner end of a counter shaft 39, the outer end of which is journaled in bearings 40, carried by the arm 28. Between the fingers 38, the shaft 39 is provided with a worm 41, arranged above a worm wheel 42, and adapted to engage therewith.

This worm wheel 42 is rigidly mounted upon a stub shaft 43, which is rotatably mounted upon a block 44. This block is slidable within a vertical chamber or pocket 45, formed in the forward side of the base or clamp element 22. The block 44 is guided so that it may move vertically, and is urged upwardly by a heavy stiff spring 46. The block is shifted downwardly by means of a rotatable element 47, having a screw threaded upper end 48, engaging within a screw threaded opening formed in the block 37. The element 47 is turned by means of a nut 49 or the like, formed integral therewith, which nut may be turned by means of a wrench or the like. It is thus seen that when the block 44 is in the elevated position, Figure 4, that the spring 46 will retain the worm wheel 41 in engagement with the worm 42. When it is desired to break this engagement, the nut 49 is turned to lower the element 47, which depresses the block 44, and worm wheel 42 will disengage the worm 42.

Depending from the stub shaft 43 is a crank 50, pivotally connected with a link 51, extending to the right, Figure 3, for pivotal connection with the crank 20.

Means are provided to transmit the rotation of the driving shaft 29, to the counter shaft 39, at selected speeds. This means comprises a gear 52, which is keyed upon the shaft 29, in a manner to slide longitudinally thereof, and turn therewith. This gear 52, is mounted within a shifting fork 53 having its ends apertured at 54, to slidably receive the shaft 29. Mounted within the shifting fork 53 is a plurality of speed reducing gears 55 and 56, the number or ratio of which may be varied, at will. The fork 53 may be shifted longitudinally of the shaft 29, and this fork is provided at its outer closed end with a shank 57, preferably integral therewith. This shank is adapted to be mounted upon any one of the stationary brackets 58, which are preferably integral with the base 22, and spaced longitudinally thereof. The shank 57 is apertured for receiving a bolt 59 or the like to engage within a screw threaded opening formed in the upper end of the selected bracket 58. By this means, the shifting fork 53 may be locked to the selected bracket 58. Rigidly mounted upon the counter shaft 39 is a plurality of gears 60, of different diameters, preferably disposed to form a stepped gear. It is obvious that the gear 56 may be brought to mesh with a selected gear 60. It is thus seen that the gear ratio between the shaft 29 and the shaft 39 may be varied, to suit the particular conditions, and that the invention is in no sense restricted to the particular type of gearing shown and described, as other forms of gearing may be employed.

Secured to the steering wheel 16 to turn therewith is a pointer 62, traveling in proximity to the stationary quadrant 63, equipped with a scale 64, representing the diameter of the path of travel of the tractor, at the outer starting point of the spiral path. I provide a contact element 65 at the inner end of the scale 63 and this contact is electrically connected with the source of current for the ignition, in such a manner as to close a short circuit for the source of current, when the pointer 62 engages therewith, and thus cut out of circuit the primary of the induction coil. It is thus seen that when the tractor has traveled to substantially the center of the field, the pointer 62 will engage the contact 65 and the engine of the tractor will be automatically stopped.

The operation of the apparatus is as follows:

The approximate diameter of the field to be plowed or the like, being obtained, the pointer is set by turning the steering wheel 16, to the desired position upon the scale, 64, corresponding to the diameter of the first turn of the spiral path of the tractor. This being done, the worm wheel 42 is now thrown into engagement with the worm 41. The tractor is now started and will pursue a spiral path over the field. The rotation from the steering wheel 13 is of course greatly reduced through the medium of the gear and worm 31 with the result that the worm wheel 42 is slowly turned in the direction to properly turn the steering wheels, in steering, so that the tractor will pursue a spiral path of travel. When the tractor approaches or reaches the center of the field its engine is automatically stopped, as described.

The invention is in no sense restricted to the steering of the tractor from the outer marginal edge of the field toward the center, as it is obvious that the same may be steered spirally from the center toward the outer edge. A slight change in the gearing, to cause the crank 50 to swing in the opposite direction, would effect this operation. I contemplate simply changing the direction of pitch of the worm 41 and worm wheel 42.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

Having thus described my invention, I claim:

1. The combination with a tractor including an axle, steering wheels mounted upon the axle, and steering means for the wheels, of a support mounted upon the axle carrying the steering wheels, a worm-wheel mounted upon the support, connecting means between the worm-wheel and the steering means, gearing mounted upon a support and embodying a worm engaging the worm-wheel, and driving connecting means between the gearing and one steering wheel.

2. The combination with a tractor including an axle, steering wheels mounted upon the axle, and steering means for the wheels, of a support mounted upon the axle, a driving shaft carried by the support, rotatable driving means between one steering wheel and the driving shaft, a counter-shaft mounted upon the support and having a worm, adjustable change speed gearing for connecting the driving shaft and counter-shaft, and a device connected with the steering means to actuate the same including a worm-wheel engaging said worm.

3. The combination with a tractor including an engine, an axle, steering wheels mounted upon the axle, and steering means for the wheels, including a hand wheel, a device connected with the steering means to actuate the same to automatically steer the tractor including a worm and worm-wheel, a relatively stationary scale arranged near the hand wheel and indicating the desired adjustment of the steering means in starting, a pointer connected with the hand wheel to move therewith, and means for effecting a disengagement between the worm and worm-wheel whereby the hand wheel may actuate the steering means for effecting the starting adjustment.

4. The combination with a tractor including an engine, an axle, steering wheels mounted upon the axle, and steering means for the wheels including a hand wheel, a device connected with the steering means to actuate the same to automatically steer the tractor including a worm and worm-wheel, a relatively stationary scale arranged near the hand-wheel and indicating the desired adjustment of the steering means in starting, a pointer connected with the hand wheel to move therewith, means for automatically stopping the engine when the pointer reaches a selected position upon the scale, and means for effecting a disengagement between the worm and worm-wheel whereby the hand wheel may actuate the steering means for effecting the starting adjustment.

5. The combination with a tractor including a front axle, ground engaging steering wheels mounted upon the front axle, steering means for the steering wheels including a crank connected with one steering wheel, a support mounted upon the front axle and extending longitudinally thereof, a drive shaft mounted upon the support and extending longitudinally of the front axle toward one steering wheel, a gear connected with the last named steering wheel, a gear connected with the drive shaft and engaging the first named gear, a counter shaft mounted upon the support and extending longitudinally of the front axle, gearing between the drive shaft and counter shaft, a crank mounted upon the support, gearing between the crank and the counter shaft, and the link extending generally longitudinally of the front axle and pivotally connected with the last named crank and with the crank connected with the steering wheel.

In testimony whereof I affix my signature.

EDMUND C. BELLINGER.